Figure 1:
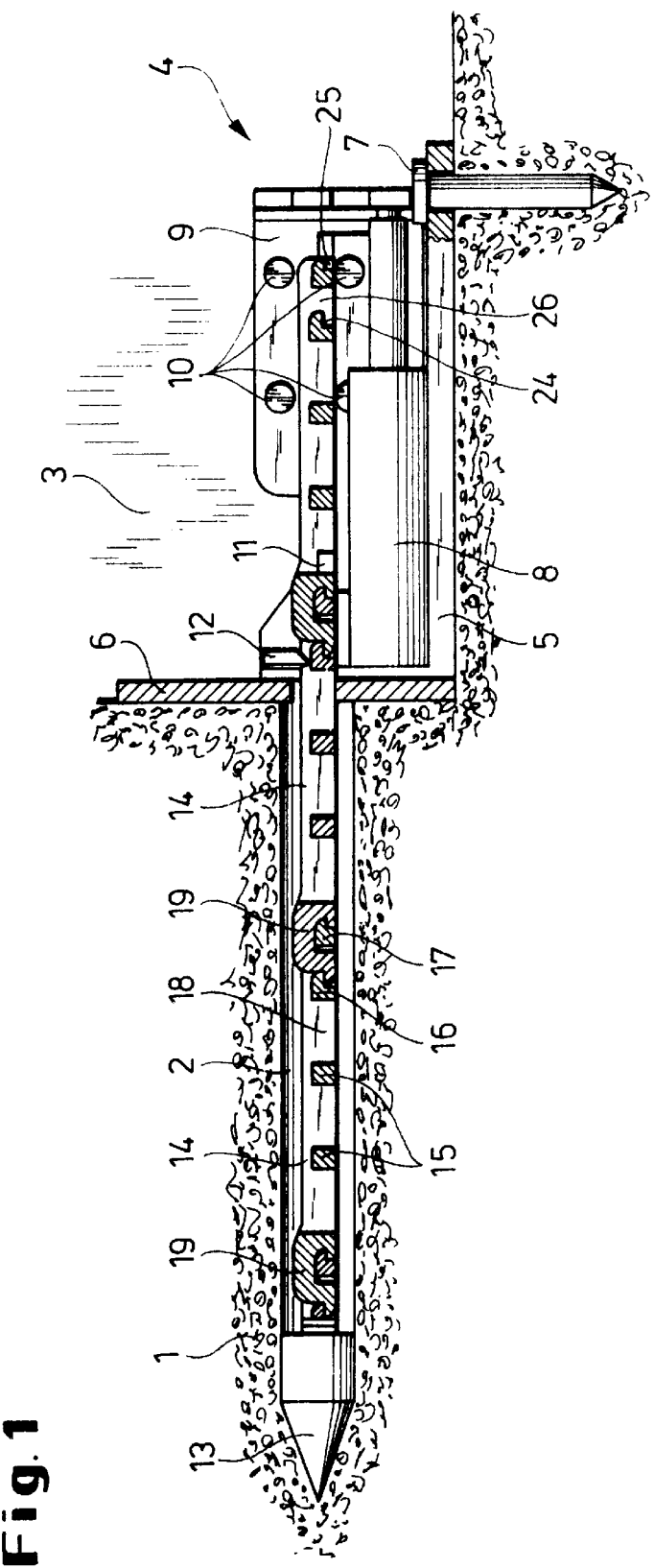

United States Patent [19]
Püttman

[11] Patent Number: 5,980,157
[45] Date of Patent: Nov. 9, 1999

[54] GROUND-BORING MACHINE

[75] Inventor: Franz-Josef Püttman, Lennestadt, Germany

[73] Assignee: Tracto-Technik Paul Schmidt Spezialmaschinen, Lennenstadt, Germany

[21] Appl. No.: 08/805,240

[22] Filed: Feb. 24, 1997

[30] Foreign Application Priority Data

Mar. 8, 1996 [DE] Germany .......................... 196 08 980

[51] Int. Cl.⁶ .................................................. E21B 17/04
[52] U.S. Cl. ............................................. 405/184; 175/22
[58] Field of Search ..................... 405/184, 232, 405/259.1, 174, 154; 175/257, 170, 171, 325.1, 19, 22, 23, 62; 254/29 R

[56] References Cited

U.S. PATENT DOCUMENTS

| | | | |
|---|---|---|---|
| 1,179,491 | 4/1916 | Ammon | 175/19 |
| 1,210,187 | 12/1916 | Marquiss | 405/184 |
| 1,872,523 | 8/1932 | Sweeney et al. | 175/22 |
| 1,916,466 | 7/1933 | Eckles | 254/29 R |
| 2,693,345 | 11/1954 | Martin et al. | 405/184 |
| 2,788,234 | 4/1957 | Doyle | 175/22 |
| 2,823,898 | 2/1958 | Bankston | 175/22 |
| 2,964,296 | 12/1960 | Cluff | |
| 3,001,761 | 9/1961 | Pittman | 254/29 R |
| 3,391,543 | 7/1968 | Sweeney et al. | 175/22 |
| 4,062,412 | 12/1977 | McIlvanie | |
| 5,213,449 | 5/1993 | Morris | 405/232 |

FOREIGN PATENT DOCUMENTS

| | | |
|---|---|---|
| 527 075 | 9/1956 | Belgium . |
| 0 526 743 | 2/1993 | European Pat. Off. . |
| 819 203 | 10/1937 | France . |
| 166 028 | 12/1905 | Germany . |
| 317 300 | 12/1919 | Germany . |
| 474 493 | 4/1929 | Germany . |
| 717 535 | 2/1942 | Germany . |

*Primary Examiner*—David Bagnell
*Assistant Examiner*—Frederick L. Lagman

[57] ABSTRACT

The invention pertains to a machine for producing or widening ground bores and/or for shattering old pipelines and laying new pipelines, consisting of a push-pull unit and a rod assembly that is connected to and driven by the push-pull unit and extends through the ground bore or the pipeline, with projections and/or recesses being arranged on the rod assembly, and with positive coupling means that engage on the projections or in the recesses arranged on the push-pull unit.

19 Claims, 8 Drawing Sheets

GROUND-BORING MACHINE

The invention pertains to a machine for forming or widening ground bores and/or for shattering old pipelines and laying new pipelines, consisting of a push-pull unit and a rod assembly that is connected to and driven by the push-pull unit and extends through the ground bore or the pipeline.

The formation or widening of ground bores and/or the shattering of old pipelines as well as the laying of new pipelines can be realized by means of ram-boring machines that generate a dynamic advance or by means of presses or winches that generate a static pressure and drive or pull the rod assembly forward. In dynamic ram-boring machines, it is disadvantageous if loud noises are produced during operation, i.e., the vibrations can damage other pipelines in the vicinity, particularly pipelines that extend parallel to or intersect the new pipeline. In addition, such ram-boring machines emit exhaust gases that contain oil and damage the environment.

Statically acting presses and winches are difficult to handle and can only be utilized in instances in which they push a thrust-proof rod assembly or pull a rod assembly with the aid of cables.

A thrust-proof rod assembly must consist of individual short rods because the pushing unit usually operates from a pit or shaft. Once a rod that corresponds to the respective diameter of the pit or shaft is pressed into the ground or the old pipeline, the rod assembly must be extended by another rod. Since the channel shafts usually have an interior diameter of 1 m, the individual rods frequently cannot have a length in excess of 80 cm.

If cable winches are used for pulling an expansion unit through an existing ground bore by means of a cable, the cable must be initially pushed through this ground bore or the existing pipeline. However, this is quite difficult due to the flexibility of the cables.

In order to press a rod assembly into the ground by means of a pushing unit, the pushing unit must engage directly on the rod assembly. Clamping jaws that engage on the outer surface of the rod assembly are used for this purpose.

Since the force of the clamping jaws is applied in nonpositive fashion, it is almost unavoidable that the clamping jaws will slip on the smooth surface of the rod assembly at elevated ground resistance. This results in wear and consequently even greater slippage.

If a rod assembly is pulled or pushed through an old pipeline to be shattered, the dirt deposited on the rod assembly causes an increased abrasion on the clamping jaws and the rod assembly, i.e., the slip between these components is additionally increased.

The rod assemblies used thus far comprise threaded connections that are extremely sensitive to dirt. This also applies to coarse pitched threads that have the additional disadvantage of tending to fracture under higher tensile stresses and in small radii of curvature. An additional disadvantage of threaded connections can be seen in the fact that a rod must be screwed on or off approximately every 80 cm; even at a high thread pitch, this requires that the pipe be turned at least seven to ten times. If the rod assembly has a length of 100 m, approximately 125 individual rods must be screwed together, i.e., the expenditure of time required for this process is quite significant.

The present invention is based on the objective of improving a machine of the initially mentioned type in such a way that it can be used for pushing as well as pulling a rod assembly, and that wear due to the slippage of the push-pull unit on the rod assembly is prevented. The invention also discloses a rod assembly connection that is tension-proof as well as thrust-proof and makes it possible to connect the individual rods with only a few manipulations.

In a machine of the initially mentioned type, this objective is attained due to the fact that the rod assembly comprises projections and/or recesses, and due to the fact that the push-pull unit comprises positive coupling means that engage on the projections or in the recesses.

These positive coupling means reliably prevent any slippage during the pushing or pulling of the rod assembly, i.e., the full power of the push-pull unit can be utilized without causing excessive wear on the rod assembly and the coupling means. The rod assembly may be realized in the form of a toothed rack or in the form of a ladder with rungs. In addition, the rod assembly may comprise annular or spiral grooves. The coupling means may be realized in the form of a toothed wheel that engages in the toothed rack, the rungs of the ladder-like rod assembly or the annular or spiral grooves. The coupling means may also consist of at least one catch element that engages with the toothed rack, the annular or spiral grooves or the rungs or projections.

The rod assembly is composed of individual rods or is realized in the form of an articulated chain. The coupling means may also consist of a catch element that engages on at least one projection or in at least one recess and is linearly driven by the push-pull unit. Consequently, the rod assembly can be linearly driven either continuously via the toothed wheel that is rotationally driven by the push-pull unit or incrementally via the push-pull unit.

A positive connection with the rod assembly is also possible if the rod assembly is threaded on at least the end that can be positively coupled to the push-pull unit, with the coupling means engaging with the aforementioned threads in this case.

In order to make it possible to push as well as pull the rod assembly or articulated chain by means of the push-pull unit, the rod assembly may consist of rods that can be positively coupled to one another in thrust-proof fashion or the articulated chain may be realized in articulated and thrust-proof fashion.

If the rod assembly is composed of individual rods, it is advantageous if one end of said rods comprises a lateral opening that is limited by lateral walls, with the other end comprising a coupling head with a tappet that extends through the lateral opening of the rod to be coupled and engages underneath a lateral wall. In addition, these rods contain a recess that overlaps the other lateral wall and a tappet that engages under the outer side of the other lateral wall if it is subjected to thrust.

Such a quick-action clamping head makes it possible to couple or decouple the individual rods once they have been pressed sufficiently far into the ground or pulled sufficiently far out of the ground, without requiring an excessive expenditure of time or labor and without extended interruptions of operation.

The lateral walls preferably comprise cutouts that are adapted to the tappets that engage underneath the lateral walls.

If the rods are realized in the form of a ladder, the lateral opening may be arranged between the last and the next-to-last rungs which form the lateral walls, with the rungs comprising the cutouts for the tappets. If the rods are realized solidly and comprise uniformly spaced recesses for the coupling means on at least one side, the lateral opening may be arranged on one end of the rod and the coupling head may be arranged on the other end.

In another advantageous method for connecting the rods to one another, each end of the rods is provided with a complimentary bayonet coupling head that consists of a longitudinal bracket that approximately corresponds to half the width of the rod, a recess on the front, outer end of the bracket, a complimentary tappet on the rod which extends parallel to the bracket, a pin that is arranged on the longitudinal bracket of one rod and a complimentary lateral bore that is arranged in the longitudinal bracket of the other rod. The bores have such dimensions that the lateral pin of one rod can be inserted into the lateral bore if both rods are angled relative to one another. In the stretched, flush position, the rods are interlocked due to the tappets that engage into the recesses.

Once a rod is pushed sufficiently far into a bore or a pipeline, this method makes it possible to attach a second, angled rod and interlock both rods by moving them into the stretched position in which they are arranged flush with the other rods. When pulling the rod assembly, this procedure is carried out analogously by angling a rod that has been pulled sufficiently far out of the bore or pipeline and disengaging the rod from the remaining rods.

If the lateral pins in the lateral bore can be displaced in the direction of the longitudinal axis of the rods, the bayonet coupling heads may engage into one another while they are subjected to thrust, in such a way that the rods are positively coupled to one another in thrust-proof fashion.

If the push-pull unit consists of a linearly movable driving element and the rod assembly comprises a thread on at least its end that can be positively coupled to the push-pull unit, the coupling means may consist of at least two radially movable clamping jaws that engage with the threads.

However, if the rods are realized in the form of a toothed rack or a ladder or are provided with annular or spiral grooves, the catch element may consist of at least one laterally movable detent pawl that couples the push-pull unit to the rods or the articulated chain in the driving direction.

Since the linearly movable push-pull unit must carry out a return stroke after the working stroke while the rod assembly should remain stationary, it is advantageous if a laterally movable detent pawl that couples or clamps the immovable part of the push-pull unit to the rods or the circulated chain opposite to the driving direction is arranged on the immovable part of the push-pull unit.

Figure 2:
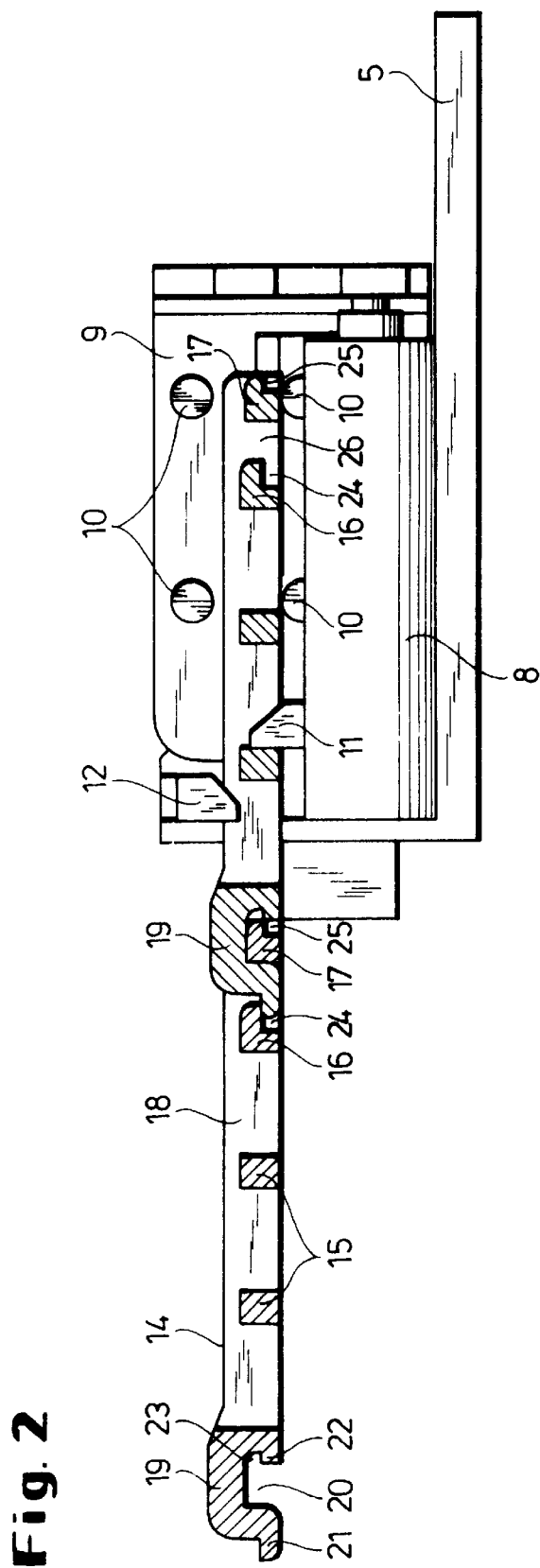
Figure 3:
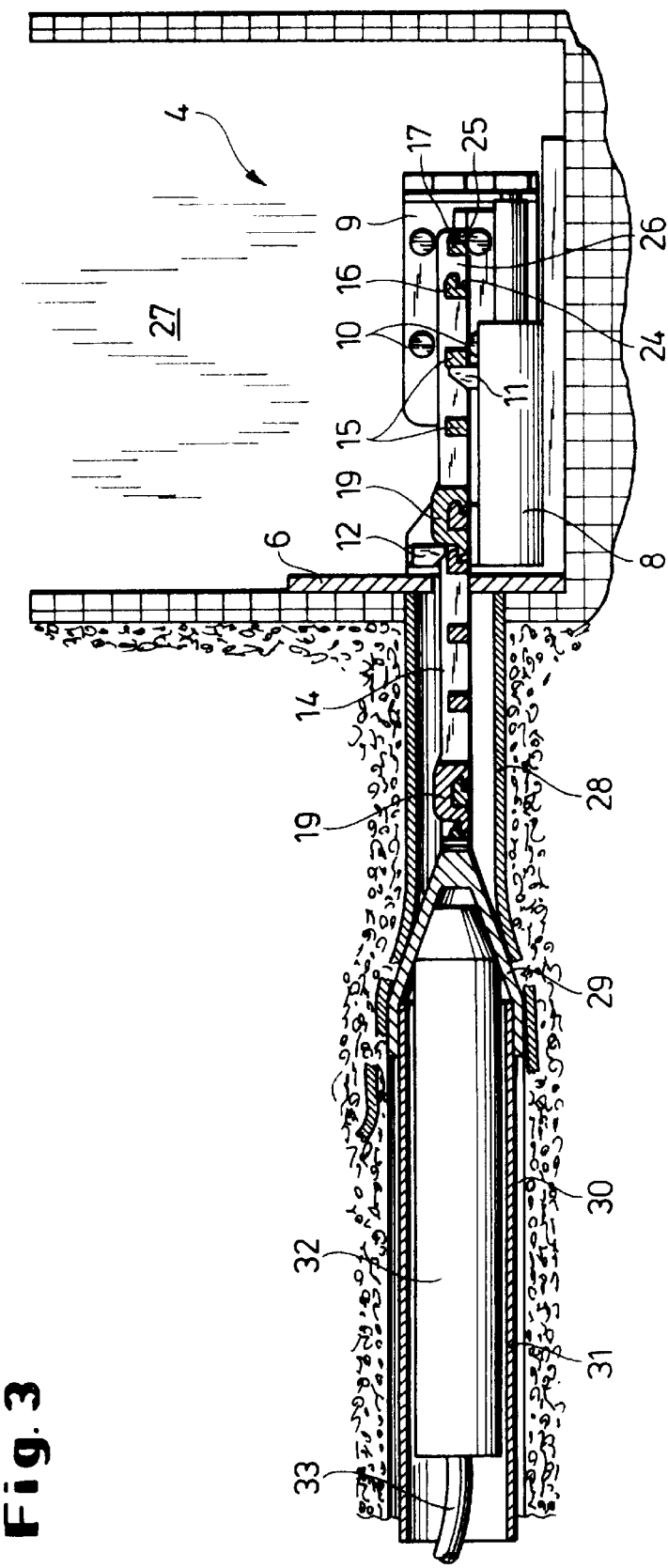
Figure 4:
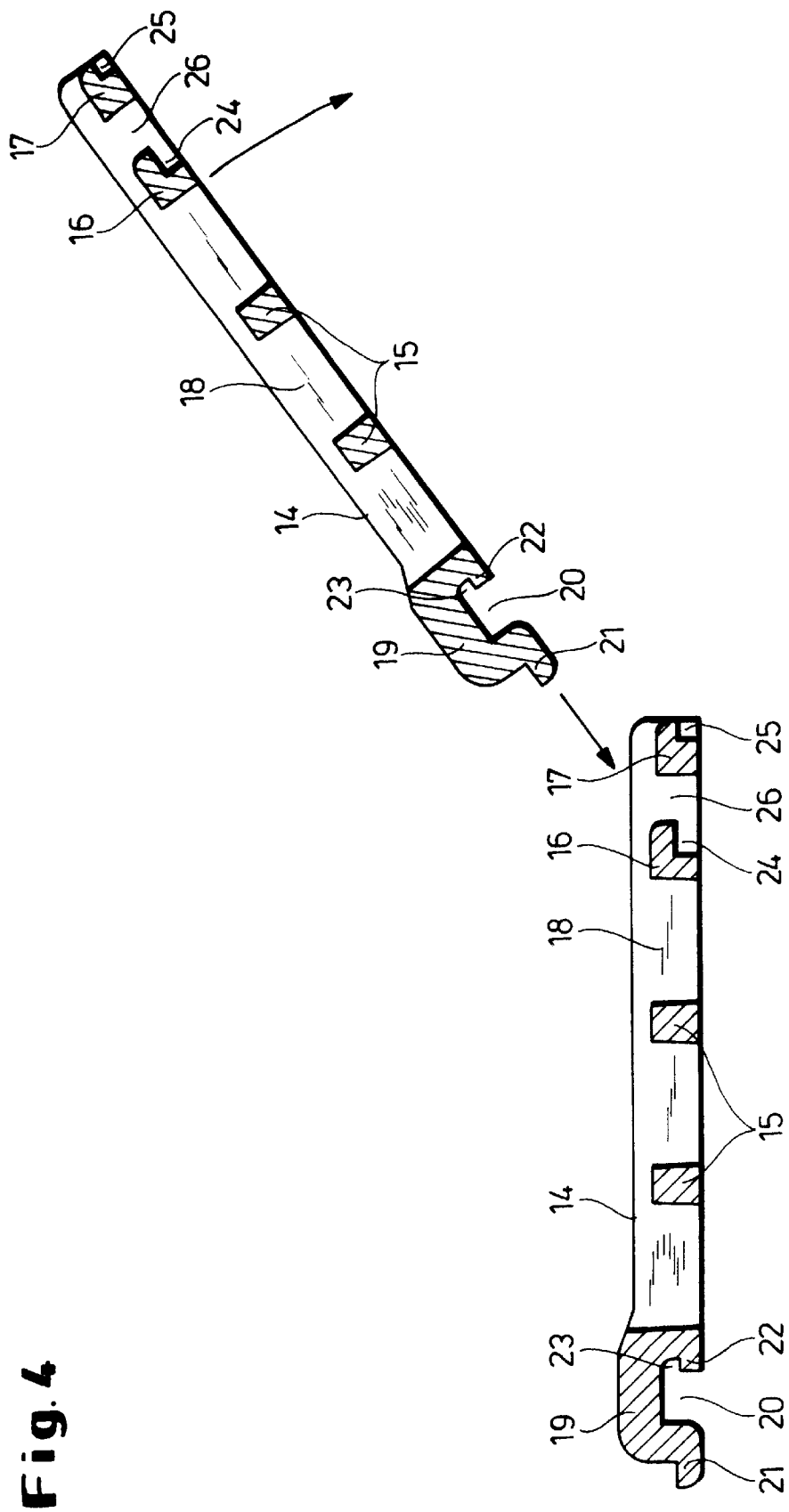
Figure 6:
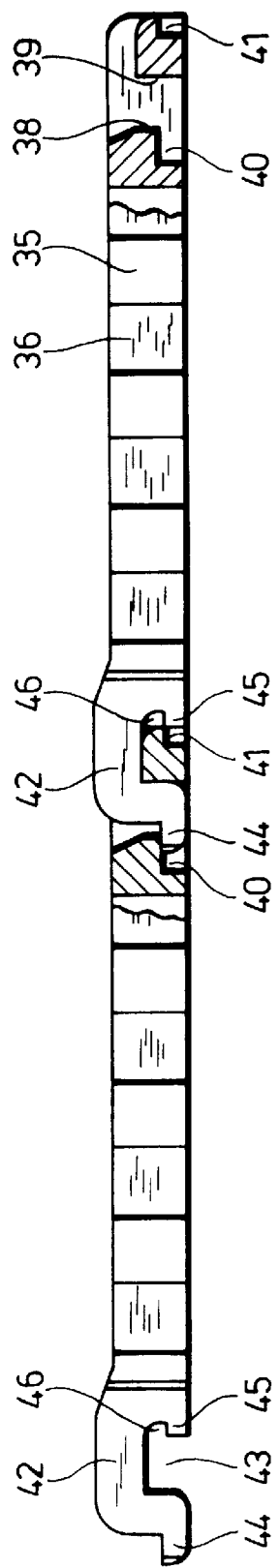
Figure 5:
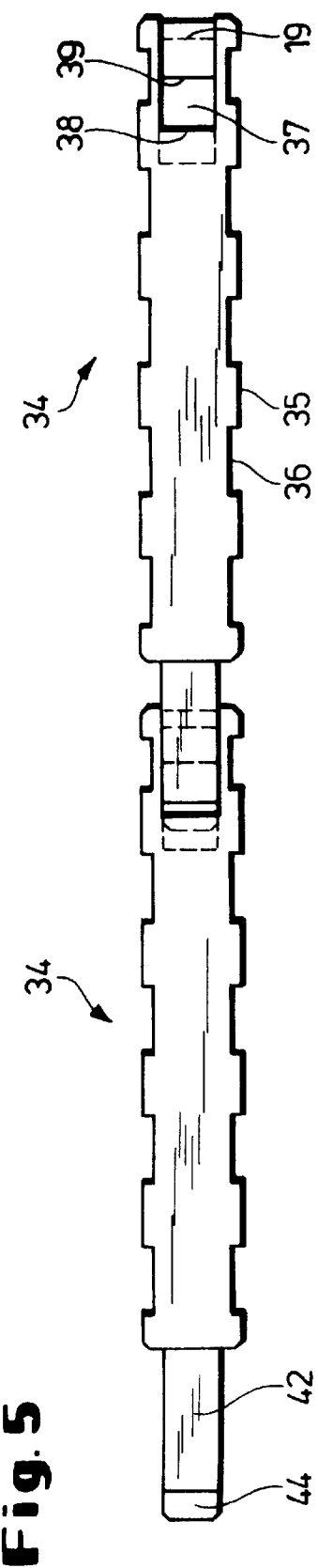
Figure 8:
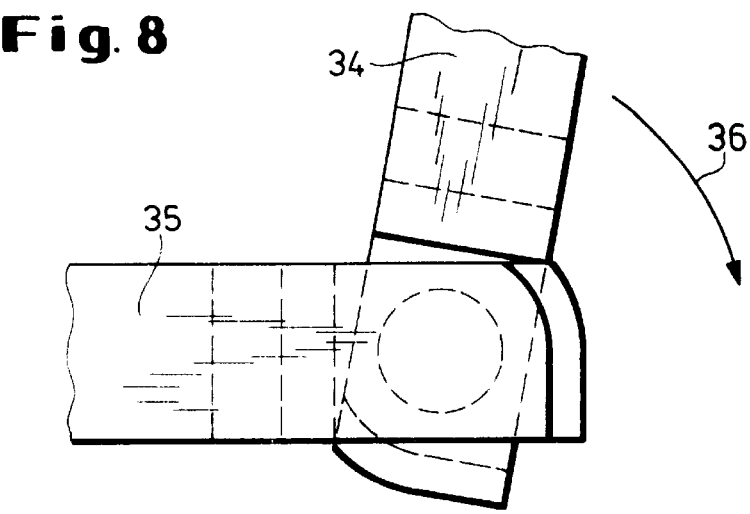
Figure 7:
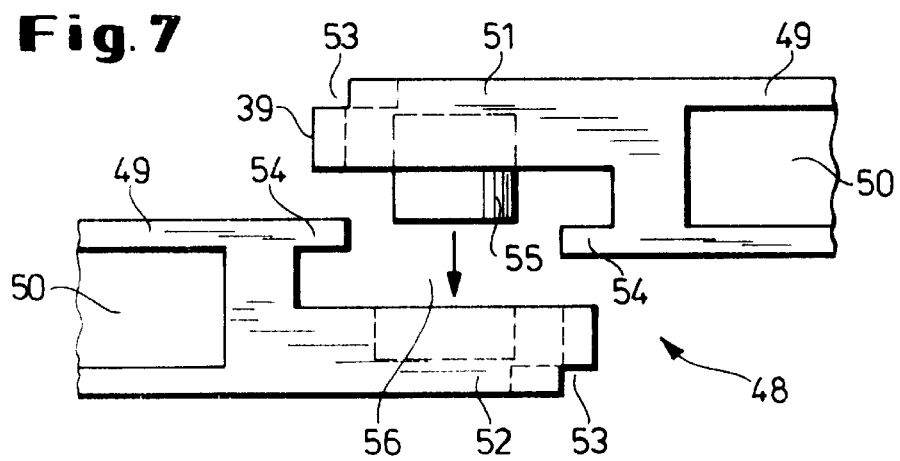
Figure 9:
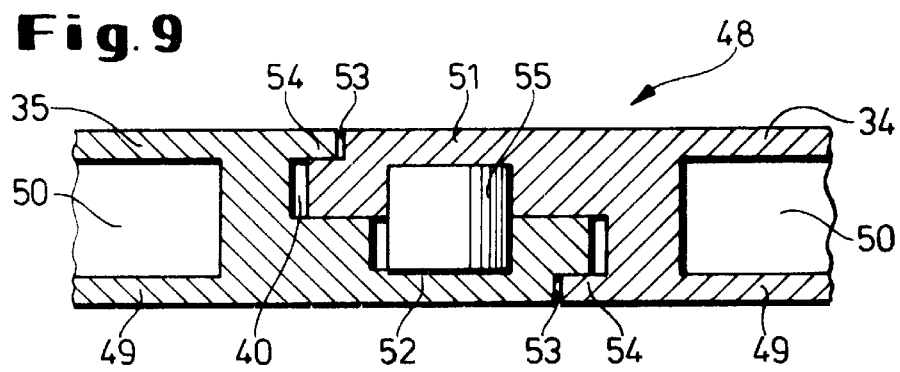
Figure 10:
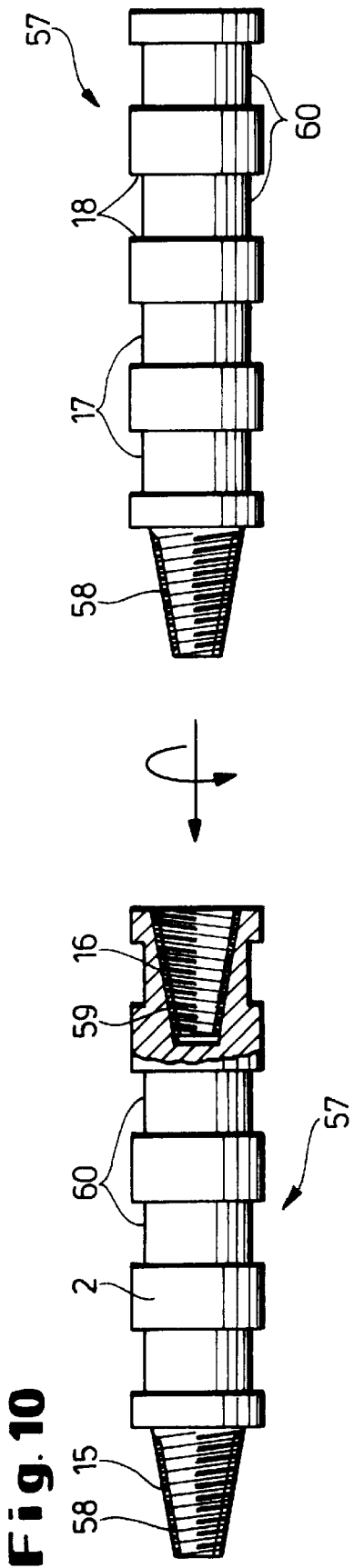
Figure 11:
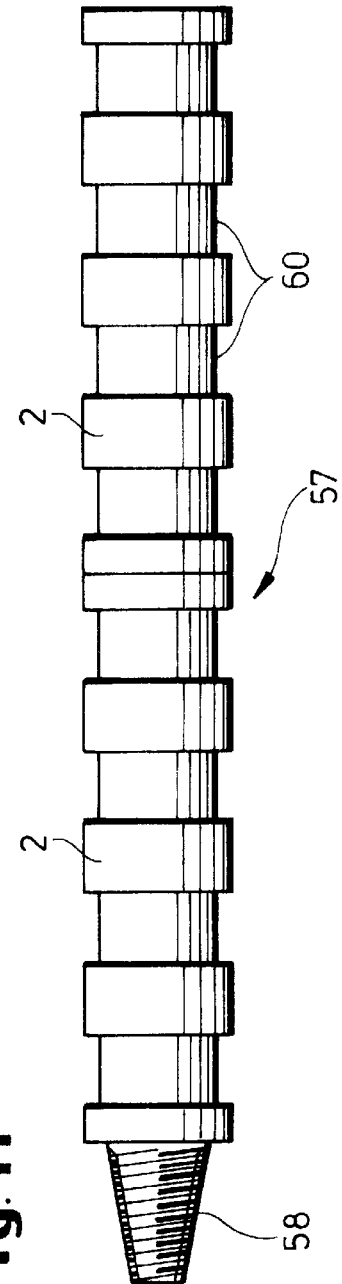

The invention is described in detail below with reference to several embodiments that are illustrated in the figures. Shown are FIG. 1, a machine consisting of a push-pull unit and a rod assembly that is connected to and driven by the push-pull unit during the production of a ground bore;

FIG. 2, a detailed side view of a push-pull unit as well as the rods that are connected to and driven by the push-pull unit;

FIG. 3, a machine consisting of a push-pull unit and a rod assembly that is connected to end driven by the push-pull unit during the shattering of an old pipeline;

FIG. 4, the rods during the coupling process;

FIG. 5, a top view of rods that are coupled to one another;

FIG. 6, a side view of the rods according to FIG. 5;

FIG. 7, a top view of different rods before they are coupled to one another;

FIG. 8, a side view of the rods according to FIG. 7 during the coupling process;

FIG. 9, the rods according to FIG. 7 in the coupled state;

FIG. 10, rods of a different design in the decoupled state;

FIG. 11, the rods according to FIG. 10 in the coupled state, and

Figure 12:
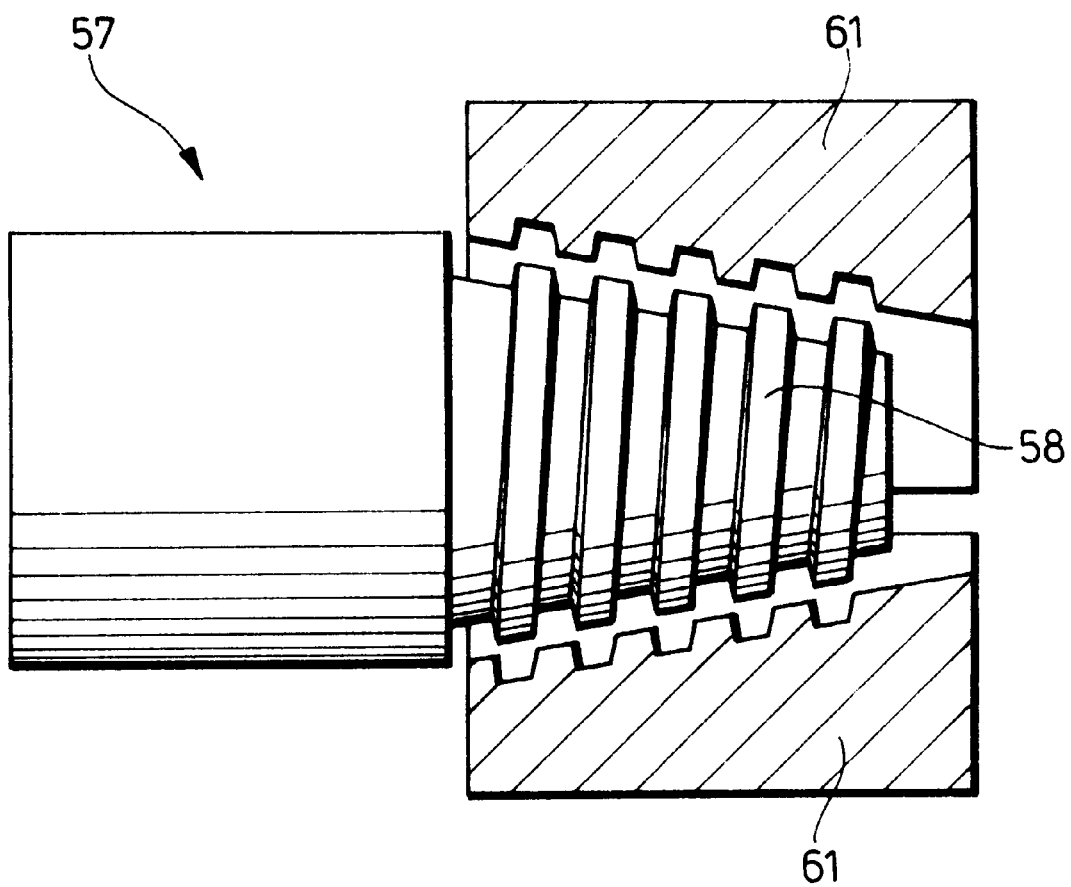

FIG. 12, a detailed representation of coupling means that cooperate with threads.

The machine according to the invention produces a bore 2 in the ground 1 which originates at a pit 3. For this purpose, a push-pull unit 4 is arranged in the pit 3. The stationary mounting 5 of this push-pull unit is supported on a wall of the ground 1 by means of a pressure plate 6 and held in its position by means of one or more ground anchors 7. A hydraulic piston/cylinder unit 8 that is able to linearly move a carriage 9 back and forth is arranged on the mounting 5. Pairs of guide bolts 10 in the carriage a serve for guiding a rod 15 of a boring rod assembly. Additional rods 14 are coupled to the rod 14 held in the carriage 9. The ground bore is produced by driving a boring tip 13 into the ground 1 by means of the rod assembly consisting of the rods 14.

The rods 14 are realized in the form of a ladder with rungs 15 and parallel bar pieces 18.

A coupling head 19 that cooperates with the next-to-last rung [16] and the last rung 17 of an adjacent rod 14 is arranged on one end of each rod 14. The coupling head 19 is provided with a recess 20 that overlaps the last rung 17. A tappet 21 on the coupling head 19 engages into a cutout 24 of the next-to-last rung 16, with a tappet 22 engaging into a cutout 25 in the last rung 17.

FIG. 1 shows that a ground bore 2 is produced by pressing the rod assembly that consists of the rods 14 and comprises the boring tip 13 into the ground 1. For this purpose, a detent pawl that is connected to the carriage 9 is arranged in such a way that it engages behind one rung 15 during the forward motion of the carriage 9 and thereby drives the rod assembly consisting of the rods 14 into the ground 1. During this pushing motion, the tappets 21, 22 engage into the cutouts 24, 25 in such a way that a thrust-proof connection between the rods 14 is ensured.

The push-pull unit 4 shown in FIG. 2 has reached the end of its advance stroke. If the carriage 9 is returned into the position shown in FIG. 1 by means of the hydraulic piston/cylinder unit 8, a detent pawl 12 arranged on the mounting of the push-pull unit 4 prevents the rod assembly consisting of the rods 14 from moving backward with the mounting 5.

The detent pawls 11, 12 may be held in the position shown in FIGS. 1 and 2 in spring-loaded fashion such that they can only be released if a rung 15, 16, 17 or a coupling head 19 moves past said detent pawls. Subsequently, the detent pawls return to the position shown. However, it is also possible to actuate the detent pawls 11, 12 in mechanical, electrical or hydraulic fashion.

Once a rod 14 is pressed into the ground bore 2 to such an extent that the next-to-last rung 16 is approximately situated in the position shown in FIG. 1, i.e., a short distance in front of the pressure plate 6, the upper guide bolts 10 are removed from the mounting 9 and an additional rod 14 is coupled to the preceding rod 14 as shown in FIG. 4. This is realized by guiding the tappet 21 of the coupling head 19 of the rod 14 to be coupled through the lateral opening 26 between the next-to-last rung 16 and the last rung 17 in an angled position, with said rod subsequently being moved into the position shown in FIGS. 1 and 2, in which the rod is arranged flush with the preceding rods 14. Subsequently, the upper guide bolts 10 are reinserted into the carriage 9 and the advance by means of the push-pull unit 4 is resumed in incremental fashion until the rod 14 has almost disappeared in the bore 2.

Due to the thrust acting upon the respectively last rod 14, the tappets 21, 22 are pushed into the cutouts 24, 25 in the next-to-last rung 16 and the last rung 17; consequently, they ensure a thrust-proof coupling between the rods 14.

When replacing an old pipeline 28 with a new pipeline 31 as shown in FIG. 3, rods 14 that are coupled to one another so as to form a rod assembly are initially pushed through the old pipeline 28 from a channel shaft 27 to an adjacent, not-shown channel shaft. Subsequently, a bursting head 29 is coupled to the coupling head 19 of the last rod 14 while the rod 14 situated in the channel shaft 27 within the region of the push-pull unit 4 is pulled into the channel shaft 27 by the hydraulic piston/cylinder unit 8 that causes a displacement of the carriage. Thus, the old pipeline 28 is shattered by means of the bursting head 29; a widened ground bore 30 is simultaneously produced and a pipe 31 that is connected to the bursting head 29 and represents the new pipeline is pulled into the ground bore 30.

In order to make it possible to pull the rod assembly consisting of the rods 14, the detent pawls 11, 12 are turned by 180° as compared to the position shown in FIG. 1.

In order to promote the shattering of the old pipeline 28, a ram-boring machine 32 that is driven by a compressed medium may be arranged on the bursting head 29. This ram-boring machine is supplied with the compressed medium via a compressed medium line 33 in the pipe 31. The impacts of the ram-boring machine 32 cause a rapid shattering of the old pipeline 28.

Telescopic cutting edges may be arranged on the bursting head 29 instead of or in addition to the ram-boring machine 32. A radial movement of these cutting edges exerts locally intensified, high forces upon the old pipeline 28 and shatter said pipeline.

The rods 34 shown in FIGS. 5 and 6 are not realized in ladder-like fashion, but rather solidly and provided with lateral projections 35. Detent pawls that are realized similar to the detent pawls 11, 12 shown in FIGS. 1–4 engage into these lateral projections during the advance motion.

A coupling head 42 is arranged on one end of each rod 34. This coupling head is provided with a recess 43 as well as tappets 44, 45. The other end is provided with a lateral opening 37 that is limited by lateral walls 38, 39, i.e., the coupling head 42 can be pivoted through this lateral opening 37 so as to couple the rod to one additional rod 34.

In this case, the tappets 44, 45 engage into the cutouts 40, 41 such that a thrust-proof coupling is also ensured in this case.

FIGS. 7–9 show one additional embodiment of a thrust-proof coupling between rods 48. These rods are realized in ladder-like fashion; however, only the parallel bar pieces as well as a cutout 50 situated adjacent to the bayonet coupling heads 51, 52 are shown. The bayonet coupling head 51 is realized in the form of a bracket that extends in the longitudinal direction of the rod 48 and has a thickness of approximately half the width of the rod 48. The end of the bayonet coupling head 51 is provided with a recess 53 that cooperates with a complimentary tappet 54 on the rod 48. The bayonet coupling head 51 is provided with a lateral pin 55 that cooperates with a lateral bore 56 on the bayonet coupling head 52.

FIG. 7 shows that the bayonet coupling heads 51, 52 are realized in complimentary fashion such that the lateral pin 55 can be inserted into the lateral bore 56 in the position shown in FIG. 8, whereafter the rods 48 can be pivoted into the elongated position, i.e., the flush position, and interlocked.

If the lateral bore 56 is realized in the form of an oblong hole, a slight relative displacement occurs if thrust acts upon the rods 48. Due to this relative displacement, the vertical surfaces of the bayonet coupling heads 51, 52 come in contact and the rods 48 are connected to one another in thrust-proof fashion.

FIGS. 10 and 11 show rods 57 that have a round or square cross section and comprises a conical outer thread 58 on one end as well as a bore 59 with a conical inner thread on the other end. Consequently, the rods 57 can be easily screwed together and form a thrust-proof rod assembly. The coupling means of the push-pull unit may engage into the recesses 60 that are realized in the form of annular grooves. In addition, it is possible to arrange spiral grooves on the outer surface of the rods 57 instead of annular grooves.

It is possible to realize the rods that are connected to one another via the conical threads in entirely smooth fashion if the positive coupling elements consist of at least two radially movable clamping jaws 61 as shown in FIG. 12. These clamping jaws cooperate with the free threads 58 at the end of the rod assembly in the push-pull unit.

If the rod assembly does not consist of individual rods, but rather an articulated chain, the articulated chain can be wound or unwound onto/from a drum in the pit 3 or in the shaft 27 without the need to interrupt the operation when rods must be attached. In case of an articulated chain, the advance movement can be realized by means of a linear drive or a rotary drive. A thrust-proof coupling between the individual chain links can be attained if the articulations of the chain links are able to carry out an axial movement such that complimentary surfaces of adjacent chain links adjoin one another under the influence of thrust, and a thrust-proof coupling is formed.

I claim:

1. Ground-boring machine, comprising
    a push-pull unit,
    a push-pull rod assembly connected to and driven by the push-pull unit, the push-pull rod assembly comprising sections coupled in a thrust-rigid manner by a two-part means for interlocking the sections by pivoting movement, wherein coupled sections are uncoupled by being positioned at an angle to each other,
    at least one selected from the group consisting of projections and recesses on the push-pull rod assembly, and
    positive coupling means of the push-pull unit which engage on the projections or in the recesses.

2. Machine according to claim 1, characterized by the fact that the rod assembly is realized in the form of a toothed rack.

3. Machine according to claim 1, characterized by the fact that the rod assembly is realized in ladder-like fashion.

4. Machine according to claim 1, characterized by the fact that the rod assembly comprises annular or spiral grooves.

5. Machine according to claim 1, characterized by the fact that the rod assembly contains threads on at least the end that can be positively coupled to the push-pull unit.

6. Machine according to claim 5, characterized by the fact that the coupling means consists of at least two radially movable clamping jaws that engage in the threads.

7. Machine according to claim 1, characterized by the fact that the coupling means consist of a toothed wheel that engages with the rod assembly and is rotationally driven by the push-pull unit.

8. Machine according to claim 1, characterized by the fact that the coupling means consists of a catch element that is linearly driven by the push-pull unit and engages on at least one projection or the threads or in a recess.

9. Machine according to claim 8, characterized by the fact that the catch element consists of at least one laterally movable detent pawl that can be coupled to the sections in the driving direction of the push-pull unit.

10. Machine according to claim 8, characterized by the fact that a laterally movable detent pawl that couples or clamps an immovable part of the push-pull unit to the sections opposite to the driving direction is arranged on the immovable part of the push-pull unit.

11. Machine according to claim 1, characterized by the fact that the interlocking means comprises a lateral opening that is limited by lateral walls on one end and a coupling head with a tappet that extends through the lateral opening of the section to be coupled and engages underneath a lateral wall on the other end, with said sections additionally comprising a recess that overlaps the other lateral wall as well as a tappet that engages underneath the outer side of the other lateral wall under the influence of thrust.

12. Machine according to claim 11, characterized by the fact that the lateral walls are provided with cutouts that are adapted to the tappets that engage underneath the lateral walls.

13. Machine according to claim 11, characterized by the fact that the sections are realized in the form of a ladder by the fact that the lateral opening lies between the last rung and the next-to-last rung that form the lateral walls, and by the fact that the rungs comprise the cutouts for the tappets.

14. Machine according to claim 11, characterized by the fact that the sections are realized solidly and comprise uniformly spaced recesses for the coupling means on at least one side.

15. Machine according to claim 1, characterized by the fact that the interlocking means comprises a complimentary bayonet coupling head on each end, with said bayonet coupling heads consisting of a longitudinal bracket that approximately corresponds to half the width of the section, a recess on the front, outer end of the bracket, a complimentary tappet on the section that extends parallel to the bracket, a lateral pin on the longitudinal bracket of one section and as well as a complimentary lateral bore on the longitudinal bracket of the outer section end, with the lateral bores having such dimensions that the lateral pin of one section can be inserted into the lateral bore if both sections are angled relative to one another, and with both sections being interlocked in the elongated, flush position by means of the tappets that engage into the recesses.

16. Machine according to claim 15, characterized by the fact that the lateral pin can be displaced in the lateral bore in the direction of the longitudinal axis of the section, and by the fact that the bayonet coupling heads engage into one another under the influence of thrust in such a way that the sections are positively coupled to one another in thrust-proof fashion.

17. A method of ground-boring, comprising:

advancing a first rod section through ground with a push-pull unit, the push-pull unit having positive coupling means engaging at least one selected from the group consisting of projections and recesses on the first rod section;

coupling a second rod section to the first rod section in a thrust-rigid manner by pivoting movement, whereby interlocking means on the rod sections are engaged; and advancing the second rod section through the ground, by the positive coupling means engaging at least one selected from the group consisting of projections and recesses on the second rod section.

18. The method of claim 17, wherein advancing the first rod section comprises at least one selected from the group consisting of destroying an existing underground pipe and widening an earth bore.

19. The method of claim 17, further comprising uncoupling the rod sections by pivoting movement, whereby the interlocking means on the rod sections are disengaged.

* * * * *